(12) United States Patent
Vivek et al.

(10) Patent No.: US 6,442,472 B1
(45) Date of Patent: Aug. 27, 2002

(54) MODIFICATION OF PEDAL PROGRESSION WITH ACCELERATION FEEDBACK USING ELECTRONIC THROTTLE CONTROL

(75) Inventors: Mehta Vivek, Rochester Hills; Steven D. Stiles, Clarkston; Richard B. Jess, Haslett; James R. Royer, Flushing, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/795,575

(22) Filed: Feb. 28, 2001

(51) Int. Cl.$^7$ ................................................ F02D 41/14
(52) U.S. Cl. ........................ 701/110; 123/350; 180/179
(58) Field of Search .......................... 701/110; 123/361, 123/350; 180/179

(56) References Cited

U.S. PATENT DOCUMENTS

| | | | |
|---|---|---|---|
| 4,718,380 A | * | 1/1988 | Katayose et al. ............ 123/399 |
| 4,911,125 A | | 3/1990 | Sugawara et al. ........... 123/399 |
| 5,307,776 A | | 5/1994 | Unuvar et al. ............... 123/399 |
| 5,477,825 A | * | 12/1995 | Hattori et al. ............... 123/399 |

* cited by examiner

*Primary Examiner*—Andrew M. Dolinar
(74) *Attorney, Agent, or Firm*—Anthony Luke Simon

(57) ABSTRACT

A method and apparatus for controlling the throttle position of a vehicle by modifying the pedal to throttle progression typically used by the electronic throttle controller to a throttle progression based on the driver's target acceleration and vehicle speed. Target acceleration is determined using a lookup table with inputs current vehicle speed and accelerator pedal displacement. Another lookup determines the end vehicle speed the driver will attain if the pedal displacement does not change. A signal indicating the new throttle position is the output of a controller whose input is the difference between end vehicle speed and current vehicle speed and whose gain is based on the target acceleration. Changes in throttle position can be limited based on an arbitration incorporating information received from other vehicle control systems. Preferably, control of the throttle will revert to the idle control system whenever the accelerator pedal is not displaced.

8 Claims, 2 Drawing Sheets

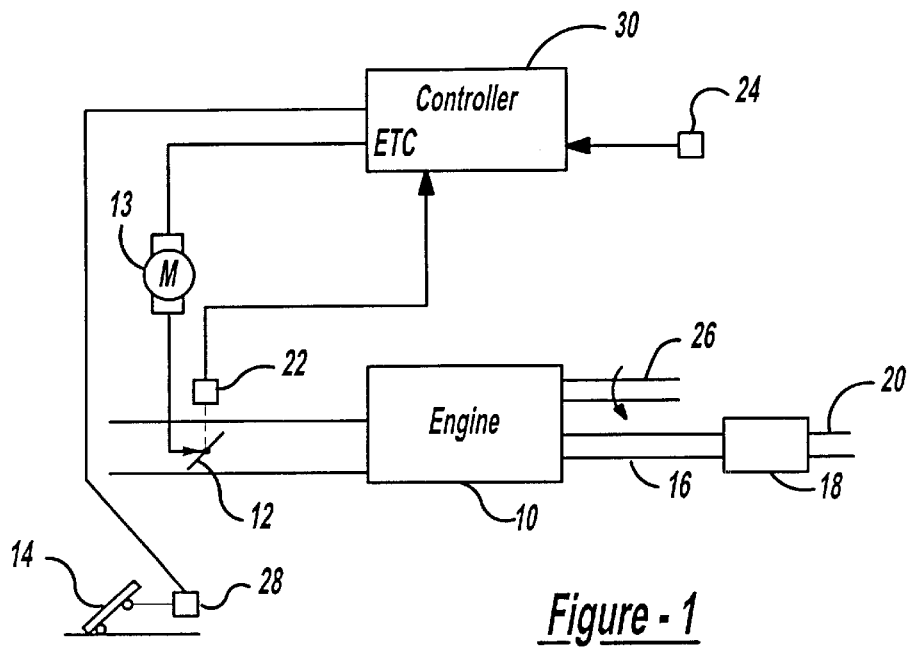
*Figure - 1*
| Accelerator Pedal Displacement (%) | | | | | | | | | | |
|---|---|---|---|---|---|---|---|---|---|---|
| MPH | 0 | 2 | 4 | 6 | 8 | 10 | 15 | 20 | 40 | 80 | 100 |
| 1 | * | 0 | .1 | .2 | .3 | .4 | .5 | .6 | .7 | .7 | .7 |
| 10 | * | -.1 | 0 | .1 | .2 | .3 | .4 | .5 | .6 | .7 | .7 |
| 20 | * | -.4 | -.1 | 0 | .1 | .2 | .3 | .4 | .5 | .6 | .6 |
| 30 | * | -.4 | -.3 | -.1 | 0 | .1 | .15 | .2 | .3 | .4 | .5 |
| 40 | * | -.4 | -.3 | -.1 | 0 | .1 | .15 | .2 | .25 | .35 | .4 |
| 50 | * | -.4 | -.4 | -.3 | -.1 | 0 | .1 | .15 | .17 | .2 | .3 |
* Idle Algorithm Control Function
*Figure - 3*
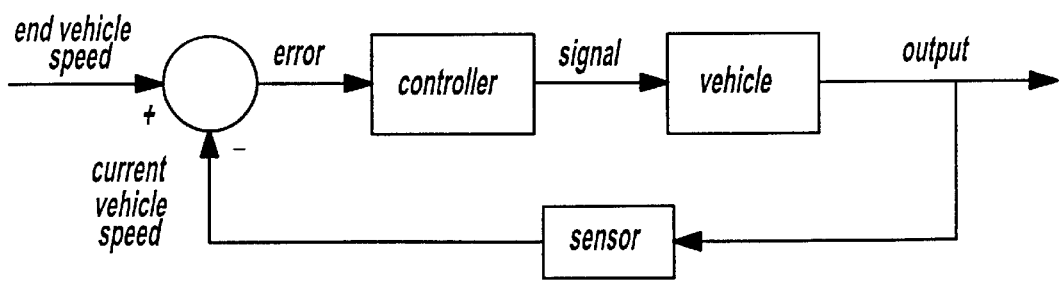
*Figure - 4*

MODIFICATION OF PEDAL PROGRESSION WITH ACCELERATION FEEDBACK USING ELECTRONIC THROTTLE CONTROL

BACKGROUND OF THE INVENTION

1. Field of the Invention

The present invention relates in general to internal combustion engine control systems and, specifically, to an internal combustion engine control system for modifying pedal progression with acceleration feedback.

2. Description of the Art

The accelerator pedal in an automobile must read the intent of the driver to: (1) accelerate the vehicle; (2) maintain vehicle speed (i.e., neither accelerate nor decelerate the vehicle); and (3) decelerate the vehicle. Moreover, the pedal must provide position feedback to the driver. Currently, these functions are performed through an electronic throttle control, which uses a simple pedal to throttle position progression table. When the accelerator pedal is displaced, the angle of the throttle is increased by a throttle actuator. This allows more air into the engine and thereby increases engine power. The spring load of the pedal changes at each pedal position, providing feedback to the driver.

Current electronic throttle control produces excessive variations in throttle position and speed for a given pedal displacement as terrain, altitude, gear, axle or vehicle load change. Further, the current method cannot predict the vehicle speed intended by the driver. Cruise control systems can also be used to accelerate or decelerate the vehicle or to maintain vehicle speed. However, such systems require hardware beyond that needed by the electronic throttle control.

SUMMARY OF THE INVENTION

The present invention is a method and apparatus for controlling the throttle position of an engine by modifying the current electronic throttle control. The invention makes changes to the throttle position using the driver's intended acceleration and speed, instead of using the current pedal progression that directly changes throttle position based on accelerator pedal displacement.

Specifically, the method starts by measuring the displacement of an accelerator pedal and the current speed of the vehicle. Using a table lookup function incorporating pedal displacement and the current vehicle speed, the driver's target acceleration is determined. A second table lookup function is used to determine the driver's intended end vehicle speed, which is the speed the driver would reach if the accelerator pedal remained at its measured displacement. Then, a desired throttle position is calculated using an acceleration-based rate of change. Preferably, a standard arbitration is performed with signals from other engine control systems. If the other systems do not indicate a need to limit changes to the throttle position, the throttle is adjusted to the desired throttle position.

The apparatus of the present invention comprises means for measuring the displacement of an accelerator pedal and the current speed of the vehicle. It also comprises a table lookup function incorporating pedal displacement and the current vehicle speed to determine the driver's target acceleration. A second table lookup function determines the driver's intended end vehicle speed. The apparatus also includes means for calculating a desired throttle position using an acceleration-based rate of change and means for performing a standard arbitration using signals from other engine control systems. Finally, the apparatus contains means for adjusting the throttle to the desired throttle position, which adjustment will occur if the other systems do not indicate a need to limit changes to the throttle position.

In one aspect of the invention, the desired throttle position is the output of a PID controller using as its input the difference between current vehicle speed and the end vehicle speed and a gain using the acceleration-based rate of change.

In one aspect of the invention, the acceleration-based rate of change is the driver's target acceleration. In another aspect of the invention, the acceleration-based rate of change is another engine parameter calculated from the driver's target acceleration, such as torque.

The present invention automatically regulates acceleration, and thus vehicle speed. This allows tracking to a target acceleration and maintaining vehicle speed at points of zero acceleration using a simple and direct interface to determine driver intent. The invention allows the driver to maintain a desired vehicle speed at a comfortable pedal position regardless of terrain, altitude or vehicle loading conditions without requiring a cruise control system. Finally, the invention accurately determines the end vehicle speed, which can be used as an input into other engine control systems such as for future enhancements in transmission shift scheduling.

BRIEF DESCRIPTION OF THE DRAWINGS

The various features, advantages and other uses of the present invention will become more apparent by referring to the following detailed description and drawings in which:

FIG. 1 is a pictorial diagram of an engine and engine control hardware involved in carrying out the present invention;

FIG. 3 is a partial lookup table of acceleration as a function of accelerator pedal displacement and vehicle speed; and FIG. 4 is a block diagram representing the inputs and outputs of the controller used in the present invention.

DETAILED DESCRIPTION

Figure 2:
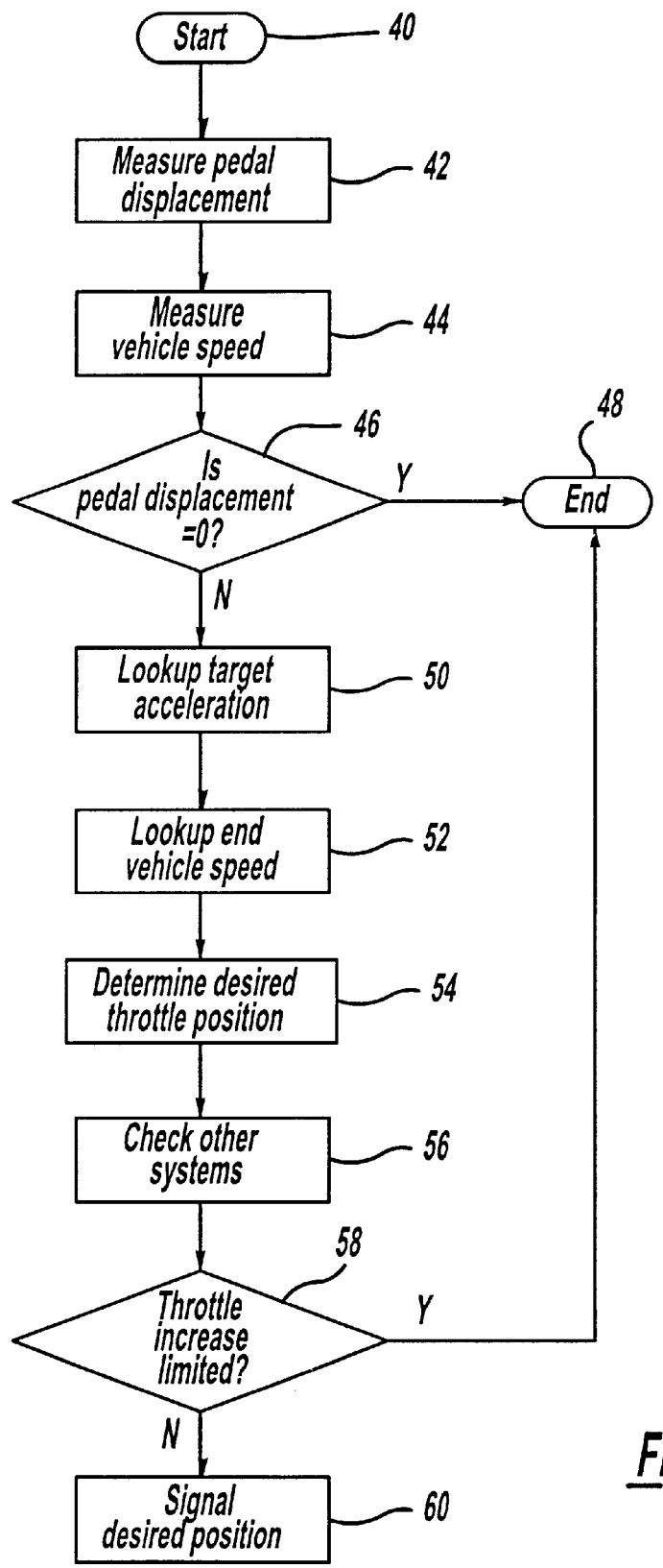
FIG. 2 is a block diagram illustrating a flow of operations for carrying out the method of this invention using the hardware of FIG. 1.

Referring now to FIG. 1, air flows into an internal combustion engine 10 through an intake throttle blade 12, which throttle blade 12 is controlled by a throttle actuator 13. The air is combined into fuel air mixtures and burned in the engine cylinders (not shown). After the air is burned in the cylinders, the exhaust gas flows through an exhaust gas conduit 16 and a catalytic device 18, finally releasing into the atmosphere through a tail pipe 20. An accelerator pedal 14 is displaced in response to operator demand for engine output power. The accelerator pedal 14 could also take the form of a stick, such as that present in a vehicle equipped for operation by the handicapped.

Associated with the engine are various conventional sensors known in the art, which provide typical signals related to engine control. Coupled to the throttle 12 is a throttle position sensor (TPS) 22. Vehicle speed is determined from a sensor 24, coupled through a flexible cable (not shown) to the driveshaft 26, which rotates at an angular speed proportional to vehicle speed. The degree to which the accelerator pedal 14 is displaced in response to operator demand for engine output power is indicated by a pedal position sensor 28.

The engine controller 30 is a conventional digital computer used by those in the art for engine control, and includes the standard elements of the central processing unit (CPU), random access memory, read-only memory, analog to digital convertor(s), input/output circuitry, and clock circuitry. The controller 30 is activated upon application of ignition power to an engine 10. When activated, the controller 30 carries out a series of operations stored in an instruction-by-instruction format in memory for providing engine control, diagnostic and maintenance operations. Signals from the previously mentioned sensors flow over the paths indicated in FIG. 1 and serve as inputs to the controller 30. Using these inputs, the controller 30 performs appropriate computations and outputs various signals. For example, the controller 30 uses the pedal position sensor 28 in an electronic throttle control algorithm to produce a signal, labeled "ETC", to control the throttle actuator 13. When the accelerator pedal 14 is displaced, the ETC signal directs the throttle actuator 13 to increase the angle of the throttle 12, allowing more air into the engine and thereby increasing engine power.

FIG. 2 shows a flow of operations to control the throttle position of the vehicle by modifying the direct relationship between the accelerator pedal 14 and engine power to a relationship based on vehicle acceleration. Specifically, such a procedure begins at step 40, and proceeds to step 42. In step 42, the accelerator pedal displacement is determined according to current methods. Hysteresis and dead band are applied to accommodate sensor noise and slight fluctuations in driver positioning of the accelerator pedal. In step 44, the current vehicle speed is measured and stored.

In a preferred aspect of the invention, the accelerator pedal displacement determined in step 42 is checked in step 46 to see if it is equal to 0%, which means that the driver is not displacing the accelerator pedal. If the accelerator pedal displacement is 0%, then the procedure ends at step 48. In this aspect, another engine control system will determine throttle position, preferably the engine's idle control algorithm. If, however, the accelerator pedal displacement is not 0%, the procedure advances to step 50. In another aspect of the invention, the procedure advances from step 46 to step 50 even if the accelerator pedal displacement determined in step 42 is equal to 0% because the present invention will determine throttle position even if the driver is not displacing the accelerator pedal.

In step 50, a table lookup function is used to provide a target acceleration based on the accelerator pedal displacement from step 42 and the current vehicle speed from step 44. A sample lookup table used for this table lookup function is illustrated in FIG. 3, which lookup table shows accelerator pedal displacement as a function of vehicle speed. By example, accelerator pedal displacement is shown as percent of displacement. Alternatively, accelerator pedal displacement could be an absolute value, such as millimeters. Similarly, vehicle speed is in miles per hour and acceleration is in $m/sec^2$ by example only. The table of FIG. 3 does not include values for the situation where the accelerator pedal displacement measured in step 42 is 0% because, in a preferred aspect of the invention, other engine control systems determine throttle position when the driver is not displacing the accelerator pedal. In another aspect of the invention, however, values can be included in the table for the condition where accelerator pedal displacement is 0%.

The table shown in FIG. 3 as an example of a lookup table for use in the present invention is only a partial lookup table developed based on a vehicle's desired accelerator response profile. Each vehicle model can have a different response profile, and thus a different lookup table than another vehicle model. Further, economy, normal and performance modes for a single vehicle could be incorporated through the use of multiple lookup tables or by multipliers. For example, given the same accelerator pedal displacement and current vehicle speed, the lookup table for the performance mode would provide a target acceleration greater than that provided by the lookup table for the economy mode.

Some examples using FIG. 3 will illustrate the use of the table lookup function to determine target acceleration in step 50 of FIG. 2. If the accelerator pedal displacement measured in step 42 is 10%, and the current vehicle speed measured in step 44 is 40 mph, then the target acceleration indicated by the driver is 0.1 $m/sec^2$. If the accelerator pedal displacement measured in step 42 is 4%, and the current vehicle speed measured in step 44 is 30 mph, then the target acceleration indicated by the driver is $-0.3$ $m/sec^2$, i.e., a target deceleration of 0.3 $m/sec^2$.

Returning now to FIG. 2, another table lookup function is used in step 52 to determine the end vehicle speed for a given accelerator pedal displacement. The end vehicle speed is the speed at which the vehicle would eventually settle if the accelerator pedal displacement remained constant. The same lookup table of FIG. 3 illustrates the operation of this table lookup function. Because zero acceleration indicates a driver's desire to maintain current vehicle speed, step 52 is performed by advancing down the column of the accelerator pedal displacement as measured in step 42 until a row indicating zero acceleration is reached. The speed corresponding to zero acceleration is the end vehicle speed. By example, if the accelerator pedal displacement is 10%, then the end vehicle speed is 50 mph. Also by example, if the accelerator pedal displacement is 4%, then the end vehicle speed is 10 mph.

Returning now to FIG. 2, a standard controller, preferably a feed forward proportional, integral and derivative (PID) controller, is used in step 54 to determine a desired vehicle speed and thus a desired throttle position. A block diagram illustrating the inputs and outputs for the controller is illustrated in FIG. 4.

Current vehicle speed measured in step 44 is the feedback variable. The difference (error) between the end vehicle speed from step 52 and the current vehicle speed from step 44 is fed into the controller, which calculates a desired vehicle speed using a gain based on the target acceleration from step 50. The target acceleration from step 50 itself can be used in the controller to determine the gain or, as is easily seen by one skilled in the art, the gain can be determined from another acceleration-based engine parameter such as torque or horsepower if, for example, a mass sensor is located on the vehicle. The output of the controller is the signal ETC, which is intended to control the throttle actuator 13 of the vehicle to a desired throttle position corresponding to the desired vehicle speed.

Returning now to FIG. 2, the desired throttle position is determined in step 54. In step 56, the procedure checks other engine control systems to determine whether these systems detect a problem limiting changes in the throttle position. Such systems include brake torque, driveline protection, traction control, and powertrain protection, to name a few. In step 58, this arbitration is performed. If any of these systems indicate a need to limit increases in the throttle position, and the desired throttle position requires an increase over the current throttle position, the procedure ends at step 48 without changing throttle position. For example, if the traction control system detects icy conditions, the result of the arbitration will be to close down the throttle, i.e., no increases in throttle position will be allowed, preventing acceleration. If, however, the other systems do not indicate a need to limit increases in the throttle position, then the procedure advances to step 60, where the signal ETC directs the throttle actuator 13 to increase, reduce or maintain the angle of the throttle 12 to the desired throttle position determined in step 54. The procedure then ends at step 48. The procedure runs at predetermined intervals from start up of the engine to shut down. Pedal displacement and speed are sampled at predetermined intervals, preferably at 12.5 ms intervals.

Thus, the present invention controls the throttle position of an engine by incorporating the driver's intentions as to target acceleration and end vehicle speed, instead of using the current pedal progression of the electronic throttle control that directly changes throttle position based on accelerator pedal displacement. In this manner, the driver can maintain a constant vehicle speed through the application of a consistent pedal displacement regardless of terrain, altitude or vehicle loading conditions without activating a cruise control system. The driver can also accelerate or decelerate the vehicle to an end vehicle speed through application of a consistent pedal displacement.

What is claimed is:

1. A method of controlling a throttle actuator to a throttle position in an internal combustion engine in a vehicle, comprising the steps of:

measuring an accelerator pedal displacement;

measuring a current vehicle speed;

using a first table lookup function to determine a target acceleration based on the accelerator pedal displacement and the current vehicle speed;

using a second table lookup function to determine an end vehicle speed based on the accelerator pedal displacement;

determining a desired throttle position using the current vehicle speed, the end vehicle speed and a gain based on the target acceleration; and signaling the throttle actuator to the desired throttle position.

2. The method according to claim 1, further comprising the steps of:

checking at least one other control system in the vehicle for a limitation to changes in the throttle position; and blocking the step of signaling the throttle actuator when the checking step indicates a limitation to increases in throttle position.

3. The method according to claim 1, wherein the step of determining the desired throttle position comprises the steps of:

inputting the difference between the current vehicle speed and the end vehicle speed into a controller; and using a gain for the controller based on the target acceleration.

4. The method according to claim 3, wherein the controller is a PID controller.

5. An apparatus for a throttle actuator to a throttle position in an internal combustion engine in a vehicle, comprising:

means for measuring an accelerator pedal displacement;

means for measuring a current vehicle speed;

a lookup table to determine one of a target acceleration based on the accelerator pedal displacement and the current vehicle speed and an end vehicle speed based on the accelerator pedal displacement;

means for determining a desired throttle position using the current vehicle speed, the end vehicle speed and a gain based on the target acceleration; and means for signaling the throttle actuator to the desired throttle position.

6. The apparatus according to claim 5, further comprising:

means for checking at least one other control system in the vehicle for a limitation to changes in the throttle position; and blocking the step of signaling the throttle actuator when the checking step indicates increases in throttle limit changes in the desired throttle position.

7. The apparatus according to claim 5, wherein determining the desired throttle position comprises:

means for inputting the difference between the current vehicle speed and the end vehicle speed into a controller; and means for using a gain for the controller based on the target acceleration.

8. The apparatus according to claim 5, wherein the controller is a PID controller.

* * * * *